United States Patent
Ohara

(10) Patent No.: US 7,760,394 B2
(45) Date of Patent: Jul. 20, 2010

(54) SHADING COMPENSATION CIRCUIT AND CONTROL METHOD THEREOF

(75) Inventor: Kunihiro Ohara, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 944 days.

(21) Appl. No.: 11/505,836

(22) Filed: Aug. 18, 2006

(65) Prior Publication Data

US 2007/0216961 A1   Sep. 20, 2007

(30) Foreign Application Priority Data

Mar. 17, 2006   (JP) .............................. 2006-074072

(51) Int. Cl.
H04N 1/40   (2006.01)
(52) U.S. Cl. ........................................ 358/1.9; 358/461
(58) Field of Classification Search .................. 358/1.9, 358/2.1, 460–461, 406, 504, 448
See application file for complete search history.

(56) References Cited

U.S. PATENT DOCUMENTS

2003/0156190 A1   8/2003 Sato et al.
2003/0156204 A1   8/2003 Sato et al.

FOREIGN PATENT DOCUMENTS

| EP | 0 447 187 A2 | 9/1991 |
| JP | 2004-320645 A | 11/2004 |
| WO | WO 2005/066893 A1 | 7/2005 |
| WO | WO 2005/076111 A1 | 8/2005 |

OTHER PUBLICATIONS

Taiwanese Office Action dated Sep. 29, 2009.

*Primary Examiner*—Thomas D Lee
*Assistant Examiner*—Stephen M Brinich
(74) *Attorney, Agent, or Firm*—Fujitsu Patent Center

(57) ABSTRACT

A shading compensation circuit is provided which is capable of storing correction coefficients for shading compensation having optimal bit lengths, so that the data size of the correction coefficients can be reduced. The shading compensation circuit 10 for correcting the shading properties with respect to a horizontal direction and a vertical direction, has horizontal correction coefficient HHK and vertical correction coefficient VHK each having a bit length optimized according to a horizontal direction counter value HCT or a vertical direction counter value VCT. The horizontal and vertical correction coefficients HHK, VHK for the periphery of the image data are longer in bit length than the correction coefficients HHK, VHK for the center of the image data.

12 Claims, 13 Drawing Sheets

BLOCK DIAGRAM SHOWING STRUCTURE OF SHADING COMPENSATION CIRCUIT CONSTRUCTED ACCORDING TO EMBODIMENT

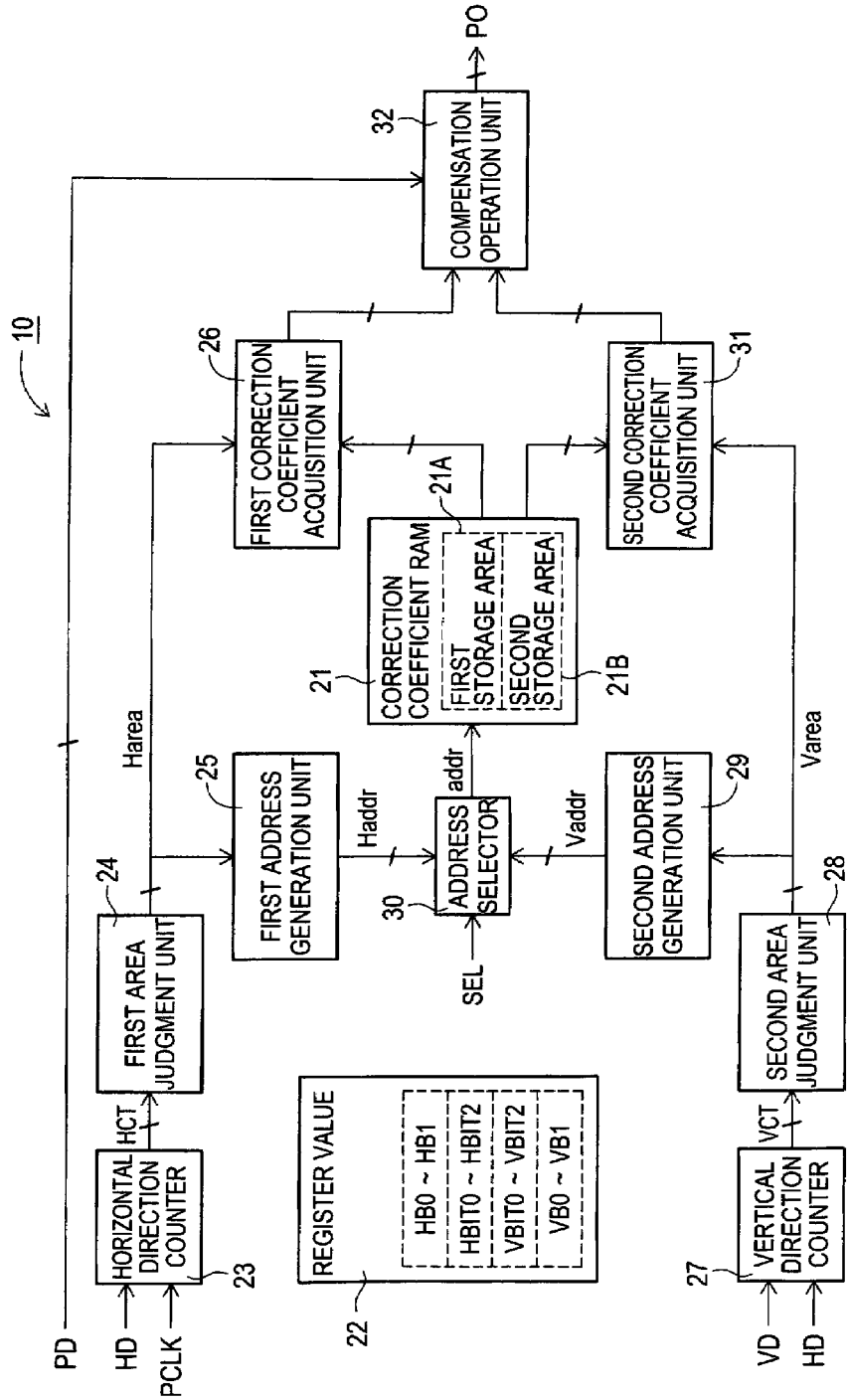
FIG. 1 BLOCK DIAGRAM SHOWING STRUCTURE OF SHADING COMPENSATION CIRCUIT CONSTRUCTED ACCORDING TO EMBODIMENT

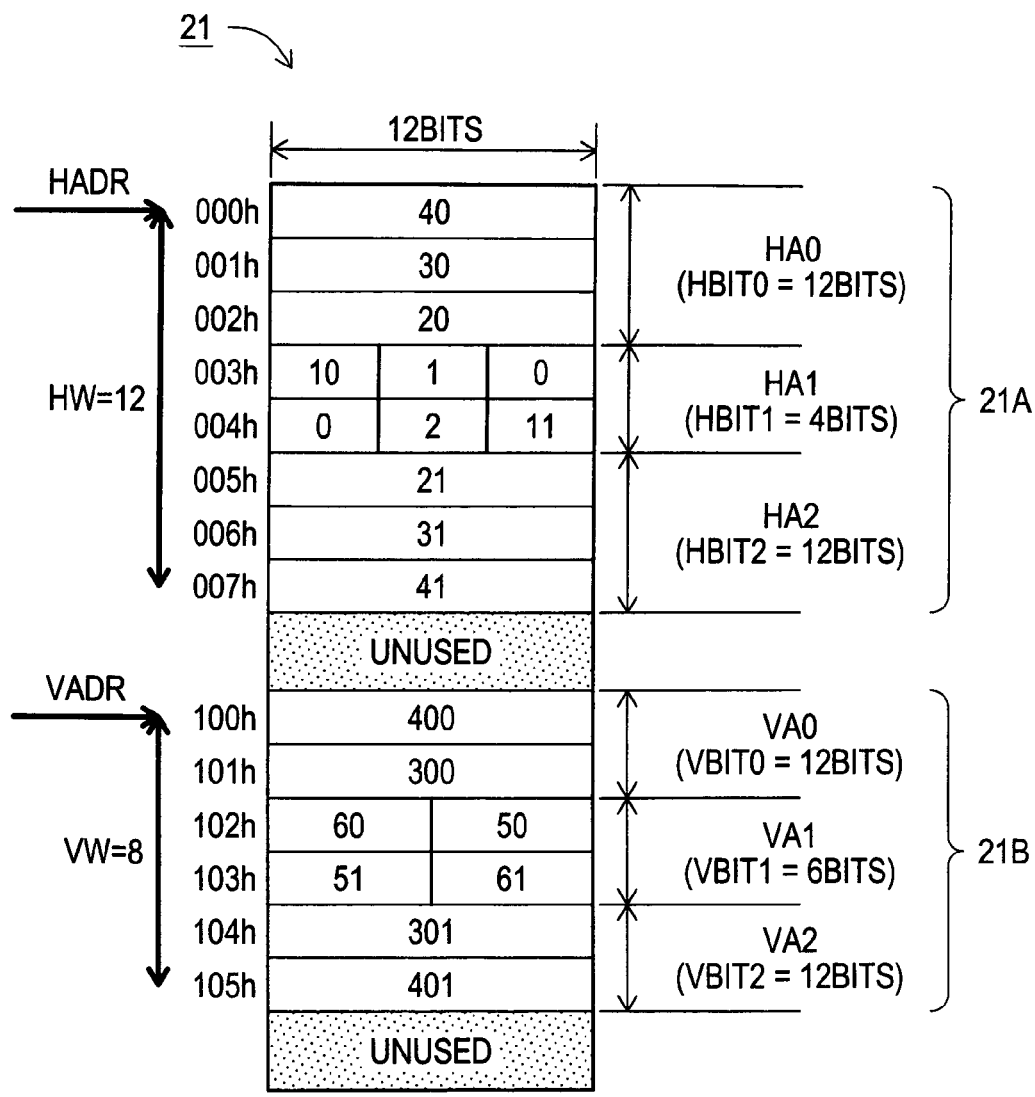
FIG. 2 EXPLANATORY DIAGRAM SHOWING CONTENTS OF CORRECTION COEFFICIENT RAM

FIG. 3  EXPLANATORY DIAGRAM SHOWING CONTENTS OF REGISTER

| VW = 8 | VERTICAL DIRECTION PIXEL NUMBER |
| HW = 12 | HORIZONTAL DIRECTION PIXEL NUMBER |

| VB0 = 2 | VERTICAL DIRECTION BOUNDARY VALUE 0 |
| VB1 = 6 | VERTICAL DIRECTION BOUNDARY VALUE 1 |
| HB0 = 3 | HORIZONTAL DIRECTION BOUNDARY VALUE 0 |
| HB1 = 9 | HORIZONTAL DIRECTION BOUNDARY VALUE 1 |

| VBIT0 = 12BITS | VA0BIT LENGTH |
| VBIT1 = 6BITS | VA1BIT LENGTH |
| VBIT2 = 12BITS | VA2BIT LENGTH |
| HBIT0 = 12BITS | HA0BIT LENGTH |
| HBIT1 = 4BITS | HA1BIT LENGTH |
| HBIT2 = 12BITS | HA2BIT LENGTH |

| VADR = 100h | VERTICAL DIRECTION CORRECTION COEFFICIENT LEAD ADDRESS |
| HADR = 000h | HORIZONTAL DIRECTION CORRECTION COEFFICIENT LEAD ADDRESS |

FIG. 4  FLOW CHART 1 OF OPERATION OF FIRST ADDRESS GENERATION UNIT
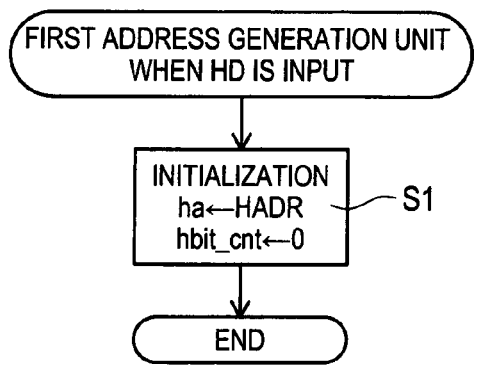
FIG. 5  FLOW CHART 2 OF OPERATION OF FIRST ADDRESS GENERATION UNIT
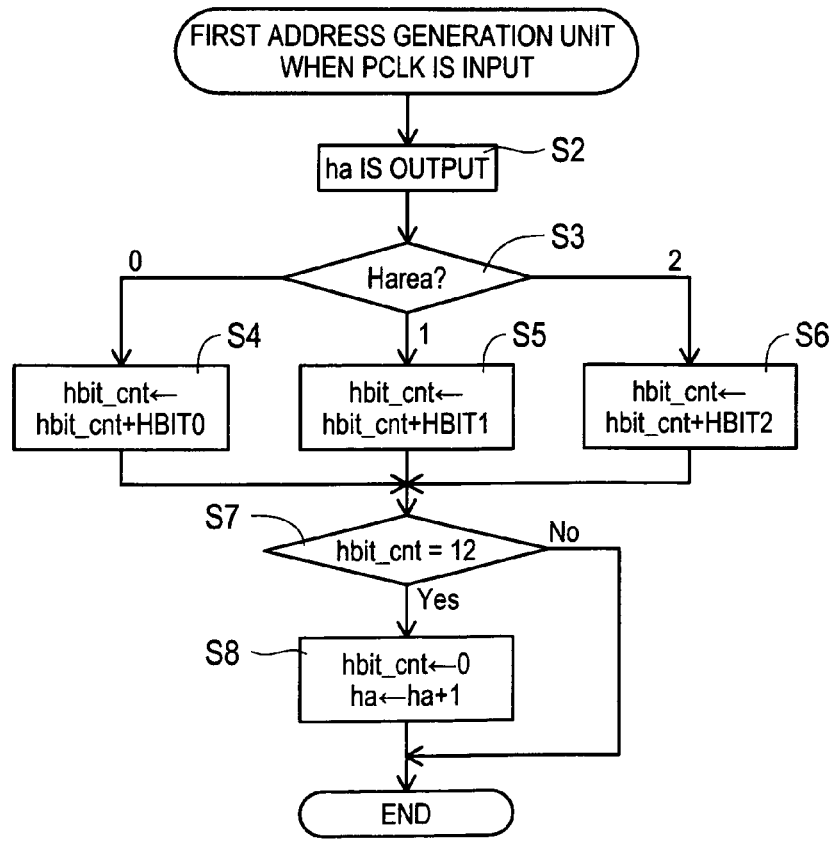

FIG. 6 FLOW CHART 1 OF OPERATION OF SECOND ADDRESS GENERATION UNIT
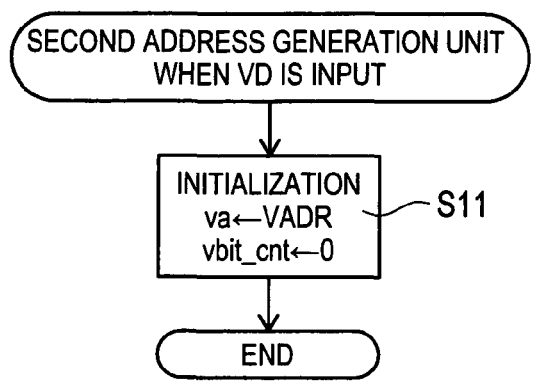
FIG. 7 FLOW CHART 2 OF OPERATION OF SECOND ADDRESS GENERATION UNIT
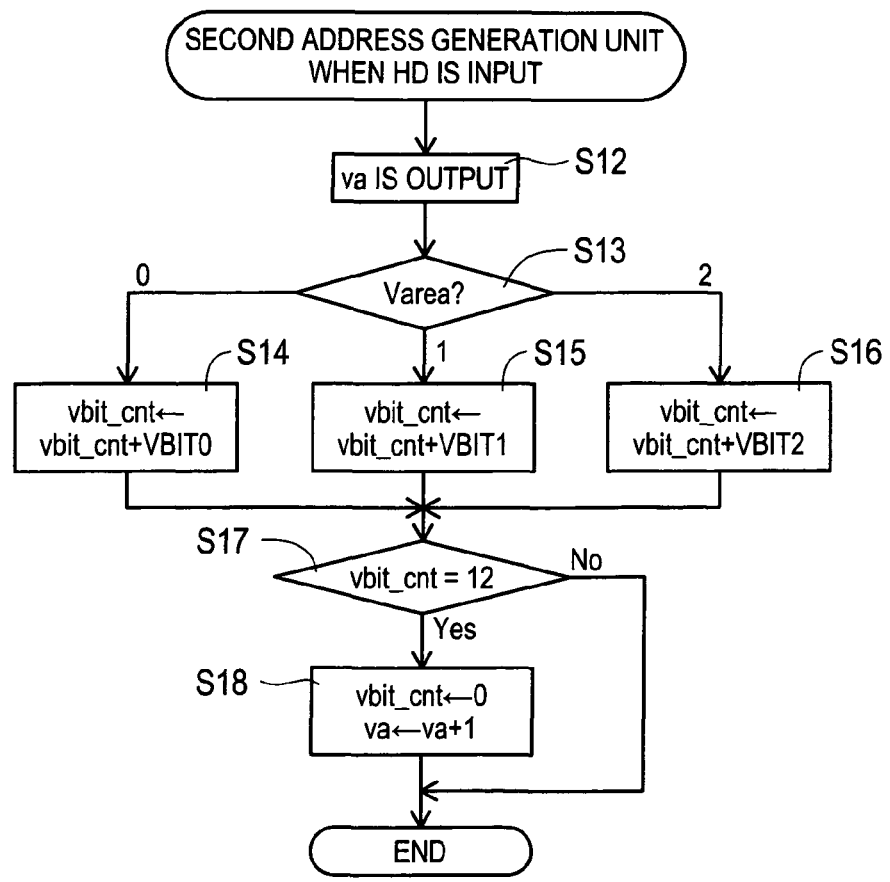

FIG. 8 BLOCK DIAGRAM SHOWING CONFIGURATION OF FIRST CORRECTION COEFFICIENT ACQUISITION UNIT
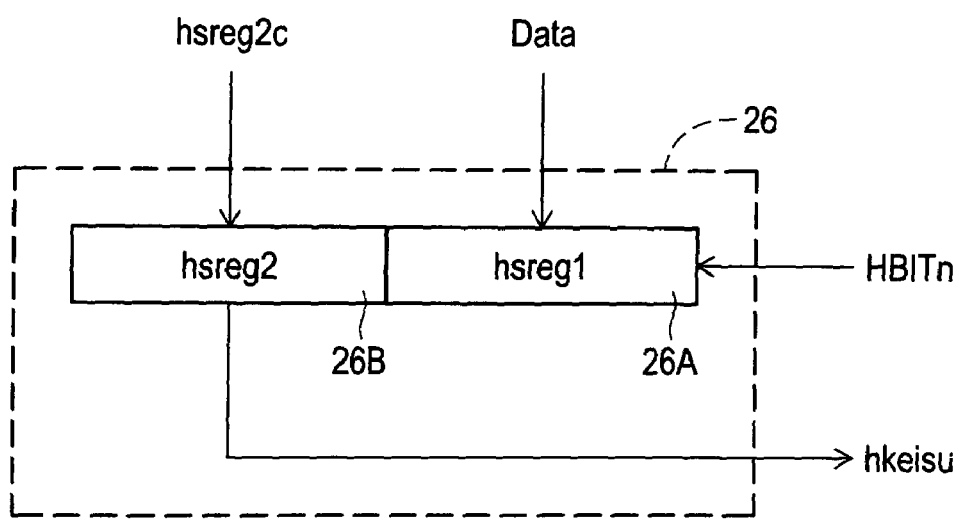

FIG. 9 FLOW CHART 1 OF OPERATION OF FIRST CORRECTION COEFFICIENT ACQUISITION UNIT
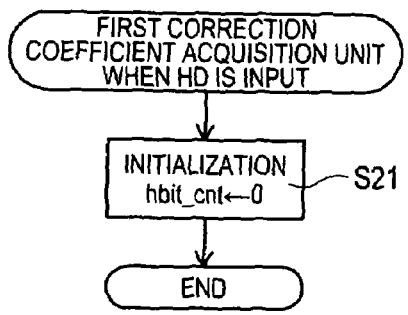
FIG. 10 FLOW CHART 2 OF OPERATION OF FIRST CORRECTION COEFFICIENT ACQUISITION UNIT
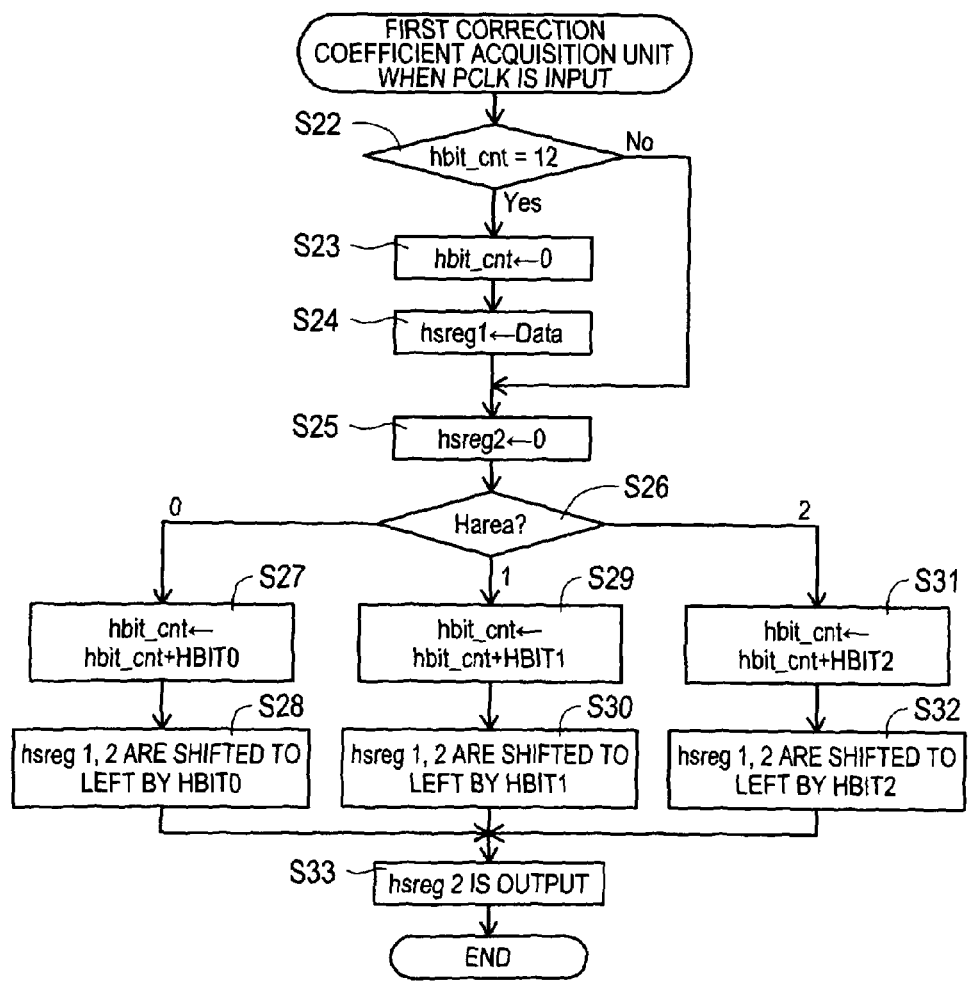

FIG. 11 BLOCK DIAGRAM SHOWING CONFIGURATION OF SECOND CORRECTION COEFFICIENT ACQUISITION UNIT
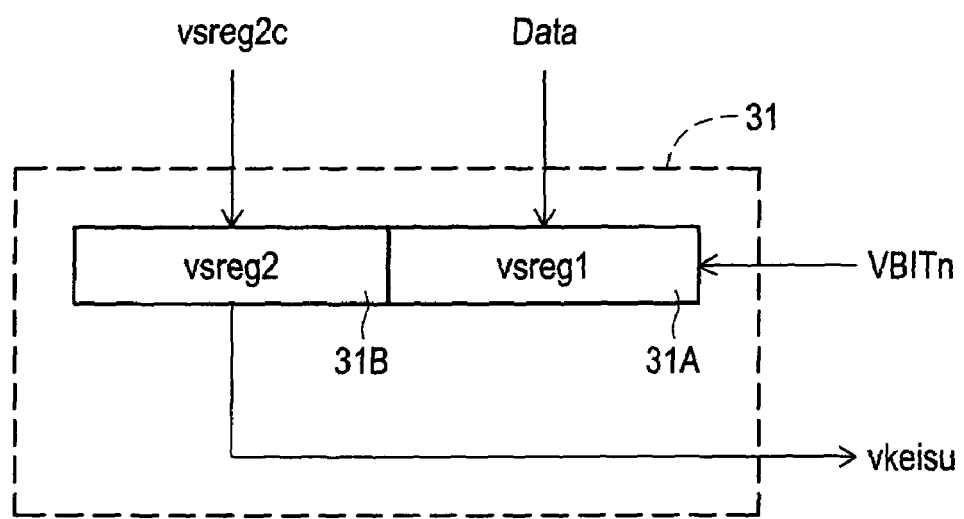

FIG. 12 FLOW CHART 1 OF OPERATION OF SECOND CORRECTION COEFFICIENT ACQUISITION UNIT
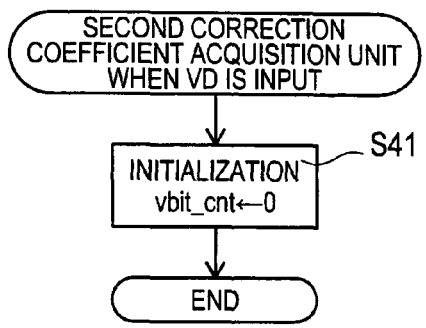
FIG. 13 FLOW CHART 2 OF OPERATION OF SECOND CORRECTION COEFFICIENT ACQUISITION UNIT
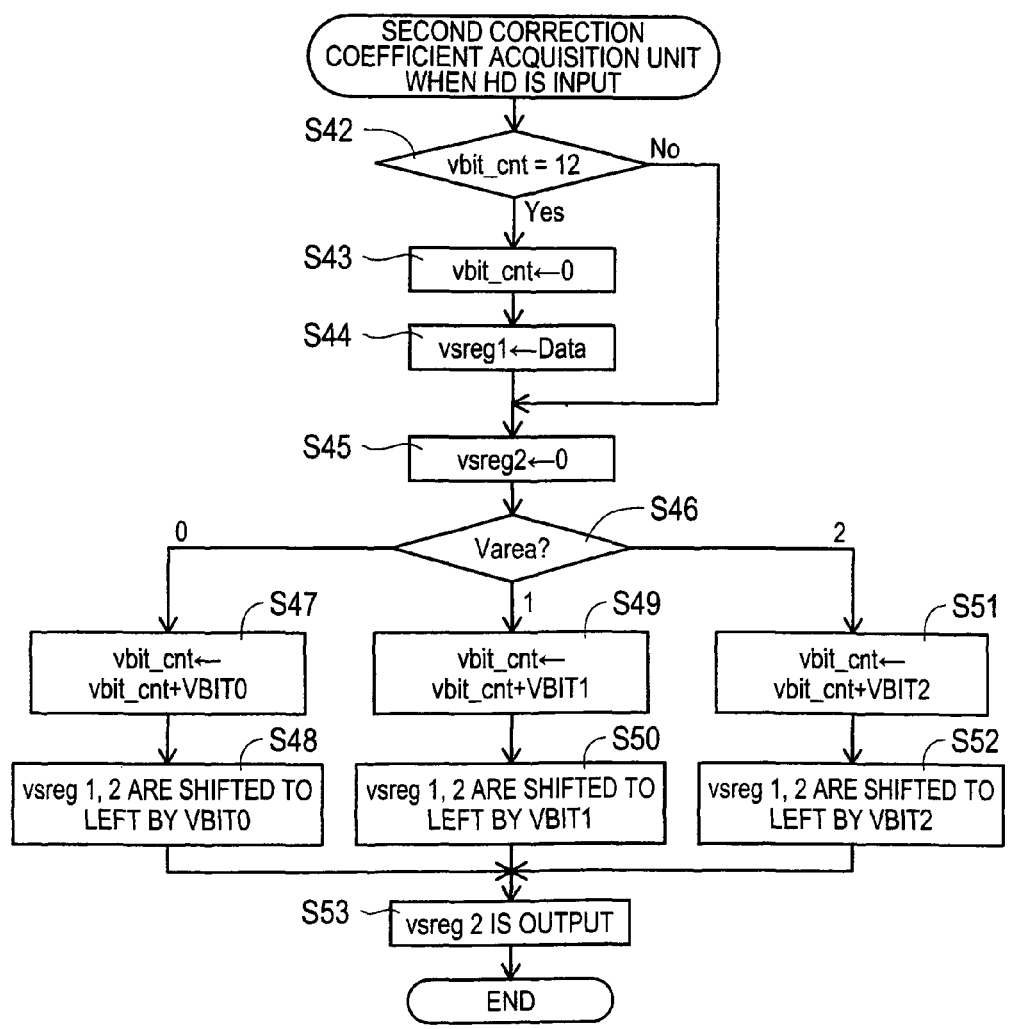

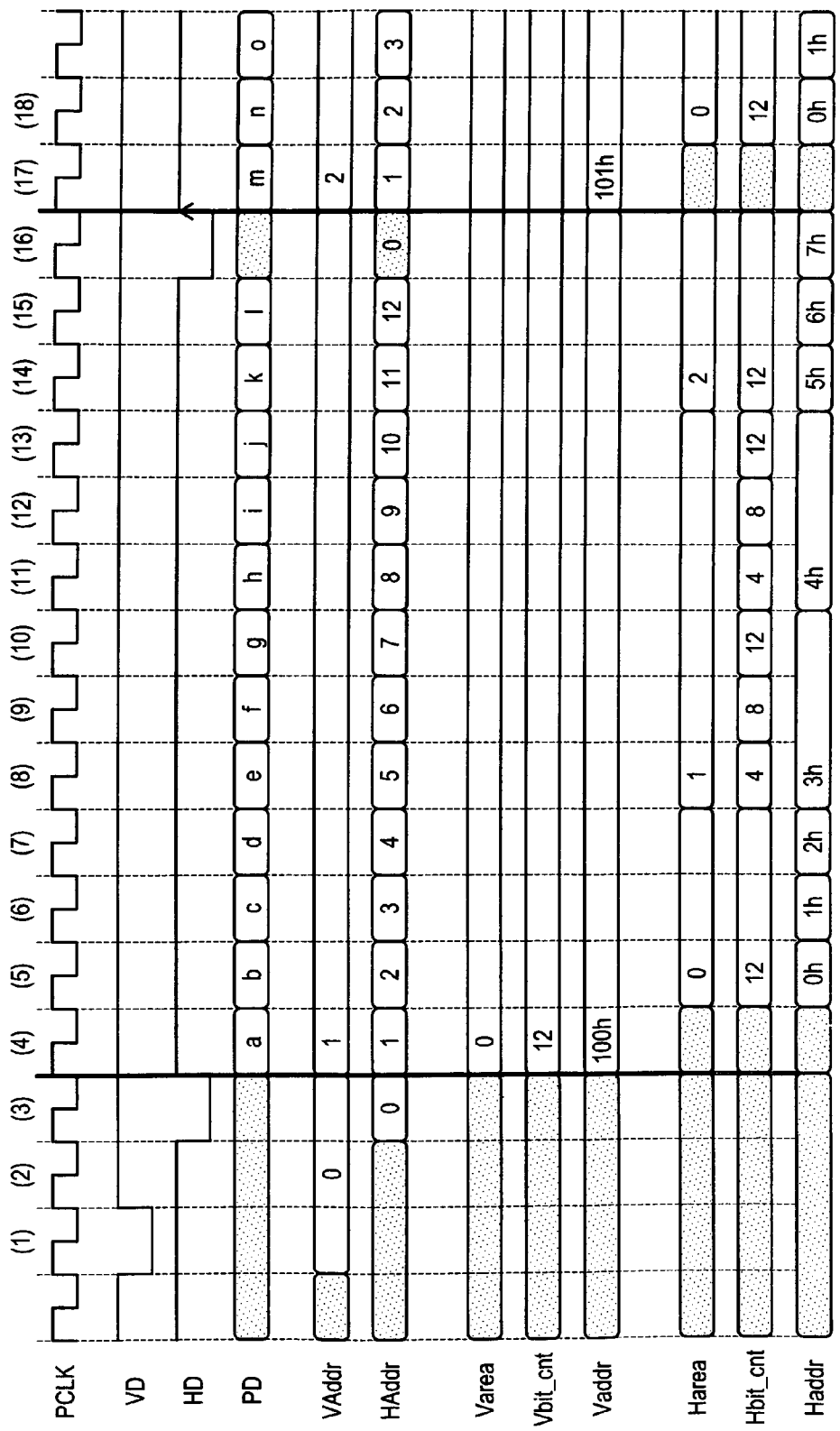
FIG. 14 TIMING CHART (1) OF OPERATION OF SHADING COMPENSATION CIRCUIT

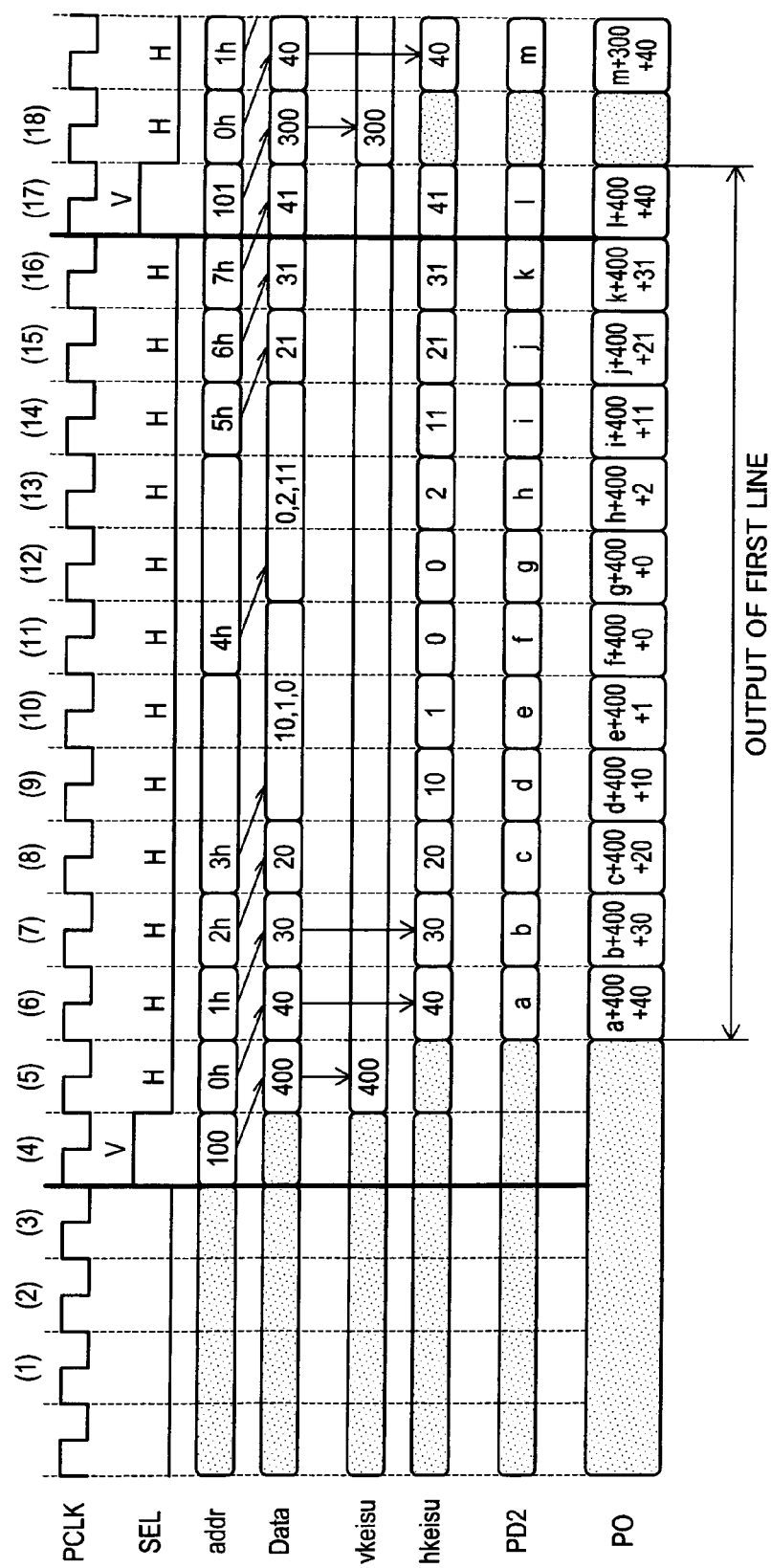
FIG. 15 TIMING CHART (2) OF OPERATION OF SHADING COMPENSATION CIRCUIT

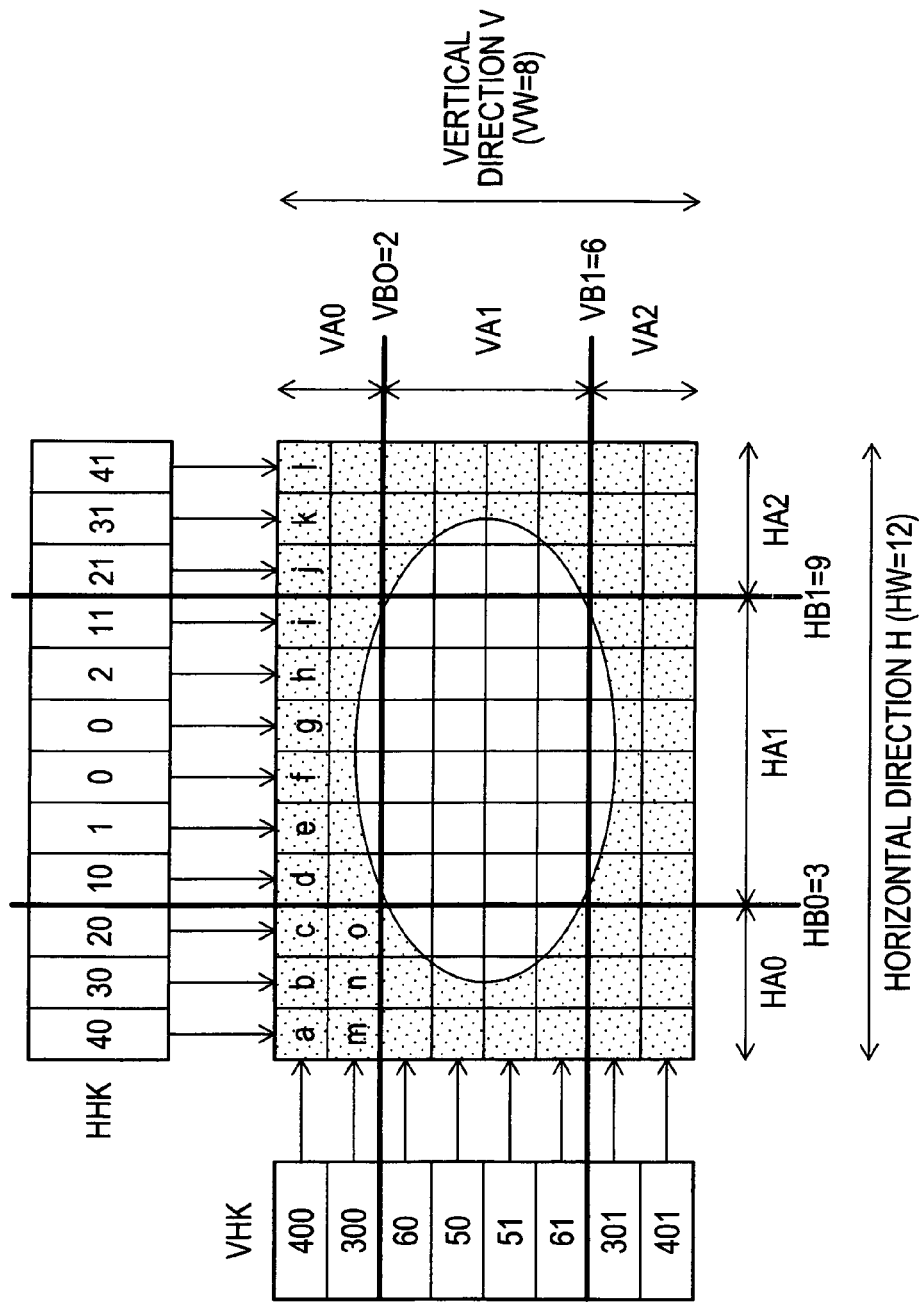
FIG. 16  EXPLANATORY DIAGRAM SHOWING RELATIONSHIP BETWEEN IMAGE DATA AND CORRECTION COEFFICIENTS

BLOCK DIAGRAM SHOWING CONFIGURATION OF
PRIOR ART SHADING COMPENSATION CIRCUIT

SHADING COMPENSATION CIRCUIT AND CONTROL METHOD THEREOF

CROSS-REFERENCE TO RELATED APPLICATIONS

This application is based upon and claims the benefit of priority from each of the prior Japanese Patent Application No. 2006-074072 filed on Mar. 17, 2006, the entire contents of which are incorporated herein by reference.

BACKGROUND OF THE INVENTION

1. Field of the Invention

The present invention relates to a shading compensation circuit for correcting the shading properties of image data taken from an image capture device such as CCD and CMOS sensors and a control method thereof.

2. Description of the Related Art

Japanese Unexamined Patent Publication No. 2004-320645 discloses a shading compensation circuit 100 (see FIG. 17) that has an address generating means 102, address converting means 103, storage means 104 and arithmetic operation means 105. The address generating means 102 generates the addresses of image data with respect to either the main scanning direction or sub scanning direction, the image data being input from the image capture device for the image area. The address converting means 103 converts the addresses generated by the address generating means 102 in a specified conversion mode selected according to an input mode selection signal MA. The storage means 104 stores correction coefficients corresponding to the addresses converted by the address converting means 103. In the arithmetic operation means 105, arithmetic operation for shading compensation is performed, using a correction coefficient read out from the storage means 104 based on an address from the address converting means 103 and the image data input from the image capture device. In this case, since there is no need to store a correction coefficient for every image data piece in the image area, the storage area used for shading compensation can be cut down. In addition, a correction coefficient appropriate and corresponding to the shading properties associated with the main or sub scanning direction can be made to reflect in each image data piece.

SUMMARY OF THE INVENTION

Regarding the shading properties of image data read out from the image capture device such as CCD, the gradient of changes in the properties relative to pixel locations is significant in the peripheral region of the image data and insignificant in the central region. Therefore, the correction coefficients used for correcting the shading properties are required to be high in accuracy in the peripheral region but are not required to have such high accuracy in the central region. Namely, the bit lengths of the correction coefficients for the central region may be shorter than those of the correction coefficients for the peripheral region.

In the shading compensation circuit 100 of the '645 publication however, the stored correction coefficients for the central region and the peripheral region have the same bit length according to the accuracy required for the peripheral region. That is, the circuit 100 has revealed such a drawback that the correction coefficients for the central region are excessively long in bit length so that they occupy the correction coefficient storage space more than necessary.

The invention is directed to overcoming the problem presented by the prior art technique and a primary object of the invention is therefore to provide a shading compensation circuit capable of storing correction coefficients for shading compensation having optimal bit lengths, so that the data amount of the correction coefficients can be reduced.

To achieve the above object, there is provided a shading compensation circuit for performing shading compensation on image data the pixels of which are arranged in a horizontal direction and a vertical direction perpendicular to the horizontal direction, such that shading properties with respect to either the horizontal or vertical direction are corrected, wherein correction coefficients each having a specified bit length are stored according to pixel positions, and wherein the correction coefficients for the periphery of the image data are longer in bit length than the correction coefficients for the center of the image data.

There is also provided a method of controlling a shading compensation circuit for performing shading compensation on image data the pixels of which are arranged in a horizontal direction and a vertical direction perpendicular to the horizontal direction, such that shading properties with respect to either the horizontal or vertical direction are corrected, the method comprising the steps of: determining correction coefficients having a specified bit length according to a pixel position; and performing shading compensation based on the correction coefficients, wherein the correction coefficients for the periphery of the image data are longer than the correction coefficients for the center of the image data.

According to the shading compensation circuit of the invention, the correction coefficients for the peripheral region of image data are longer in bit length than those for the central region. This conforms to the shading properties that require correction coefficients having shorter bit lengths in the central region than in peripheral region and therefore enables it to reduce the amount of correction coefficient data.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a block diagram showing the structure of a shading compensation circuit constructed according to an embodiment;

FIG. 2 is an explanatory diagram showing the contents of a correction coefficient RAM;

FIG. 3 is an explanatory diagram showing the contents of a register;

FIG. 4 is a flow chart of an operation of a first address generation unit;

FIG. 5 is a flow chart of an operation of the first address generation unit;

FIG. 6 is a flow chart of an operation of a second address generation unit;

FIG. 7 is a flow chart of an operation of the second address generation unit;

FIG. 8 is a block diagram showing the configuration of a first correction coefficient acquisition unit;

FIG. 9 is a flow chart of an operation of the first correction coefficient acquisition unit;

FIG. 10 is a flow chart of an operation of the first correction coefficient acquisition unit;

FIG. 11 is a block diagram showing the configuration of a second correction coefficient acquisition unit;

FIG. 12 is a flow chart of an operation of the second correction coefficient acquisition unit;

FIG. 13 is a flow chart of an operation of the second correction coefficient acquisition unit;

FIG. 14 is a timing chart of an operation of the shading compensation circuit;

FIG. 15 is a timing chart of the operation of the shading compensation circuit;

FIG. 16 is an explanatory diagram showing the relationship between image data and correction coefficients.

DETAILED DESCRIPTION OF THE PREFERRED EMBODIMENTS

Figure 17:
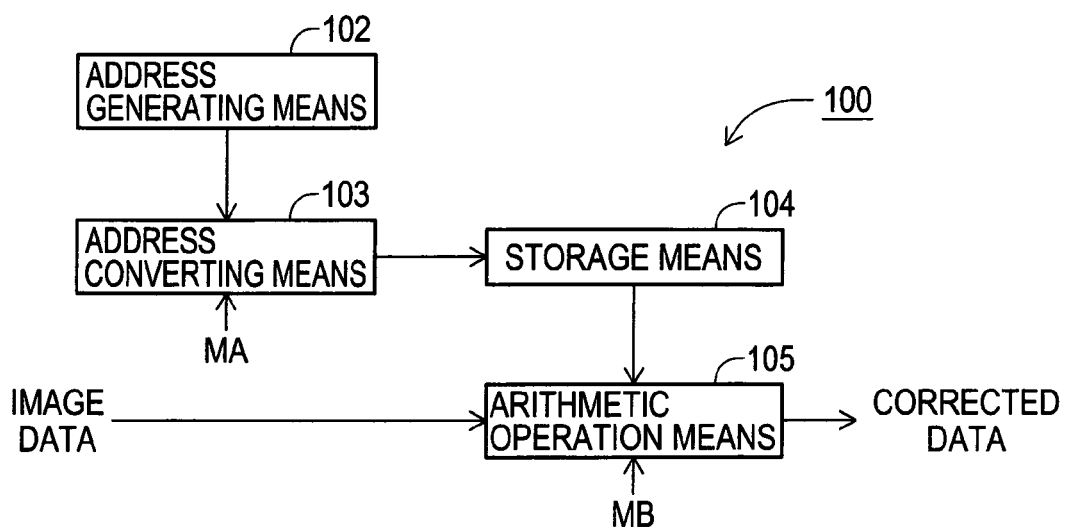
FIG. 17 is a block diagram showing the configuration of a prior art shading compensation circuit.

Referring now to FIGS. 1 to 16, a shading compensation circuit device will be described in detail according to a preferred embodiment of the invention.

FIG. 1 is a block diagram showing the structure of a shading compensation circuit 10 constructed according to this embodiment.

The shading compensation circuit 10 is one example of circuits that input pixel data PD, a clock signal PCLK, a horizontal synchronization signal HD and a vertical synchronization signal VD and corrects the shading properties of the pixel data PD based on shading correction coefficients pre-stored in a correction coefficient RAM 21.

The shading compensation circuit 10 includes the correction coefficient RAM 21; a register value 22 in a CPU (not shown); a horizontal direction counter 23; a first area judgment unit 24; a first address generation unit 25; a first correction coefficient acquisition unit 26; a vertical direction counter 27; a second area judgment unit 28; a second address generation unit 29; an address selector 30; a second correction coefficient acquisition unit 31 and a compensation operation unit 32. Some of the components of the shading compensation circuit 10 are controlled by the CPU (not shown).

FIG. 2 is an explanatory diagram showing the contents of the correction coefficient RAM 21.

The correction coefficient RAM 21 for storing correction coefficients consists of a known RAM and includes, in its memory area, a first storage area 21A for storing horizontal correction coefficients HHK that are correction coefficients associated with the horizontal direction and a second storage area 21B for storing vertical correction coefficients VHK that are correction coefficients associated with the vertical direction. In this embodiment, the first storage area 21A has a horizontal direction correction coefficient lead address HADR=000h to an address 007h and the second storage area 21B has a vertical direction correction coefficient lead address VADR=100h to an address 105h.

In addition, the first storage area 21A is divided into three areas, i.e., a horizontal area HA0 (addresses 000h to 002h), a horizontal area HA1 (addresses 003h to 004h), and a horizontal area HA2 (addresses 005h to 007h). In the horizontal area HA0, bit length HBIT0=12 bits and three correction coefficients are stored. In the horizontal area HA1, bit length HBIT1=4 bits and six correction coefficients are stored. In the horizontal area HA2, bit length HBIT2=12 bits and three correction coefficients are stored. That is, 12 correction coefficients corresponding to 12 horizontal direction pixels HW (horizontal direction pixel number HW=12) are stored.

This embodiment exemplifies the case where the bit length (12 bits) of the correction coefficient RAM 21 is the dividend of the bit length (4 bits, 6 bits, 12 bits) of each area and the word boundaries of the correction coefficient RAM 21 coincide with the boundaries of the areas.

The second storage area 21B is divided into three areas, i.e., a vertical area VA0 (addresses 100h to 101h), a vertical area VA1 (addresses 102h to 103h), and a vertical area VA2 (addresses 104h to 105h). In the vertical area VA0, bit length VBIT0=12 bits and two correction coefficients are stored. In the vertical area VA1, bit length VBIT1=6 bits and four correction coefficients are stored. In the vertical area VA2, bit length VBIT2=12 bits and two correction coefficients are stored. That is, 8 correction coefficients corresponding to 8 vertical direction pixels (vertical direction pixel number VW=8) are stored.

FIG. 3 is an explanatory diagram showing the contents of the register value 22. The register value 22 stores set values that are referred to in the processing flows described later according to the size and properties of the image data to be subjected to the shading compensation.

"8 pixels" is stored as the vertical direction pixel number VW that indicates the number of pixels in the vertical direction, whereas "12 pixels" is stored as the horizontal direction pixel number HW that indicates the number of pixels in the horizontal direction.

"2 pixels" is stored as a vertical direction boundary value VB0 that indicates the number of vertical direction pixels in the area located at the lead address to the vertical area VA1. "6 pixels" is stored as a vertical direction boundary value VB1 that indicates the number of vertical direction pixels in the area located at the lead address to the vertical area VA2.

"3 pixels" is stored as a horizontal direction boundary value HB0 that indicates the number of horizontal direction pixels in the area located at the lead address to the horizontal area HA1. "9 pixels" is stored as a horizontal direction boundary value HB1 that indicates the number of horizontal direction pixels in the area located at the lead access to the horizontal area HA2.

"12 bits" is stored as a bit length VBIT0 that indicates the bit length of the correction coefficients stored in the vertical area VA0. "6 bits" is stored as a bit length VBIT1 that indicates the bit length of the correction coefficients stored in the vertical area VA1. "12 bits" is stored as a bit length VBIT2 that indicates the bit length of the correction coefficients stored in the vertical area VA2.

"12 bits" is stored as the bit length HBIT0 that indicates the bit length of the correction coefficients stored in the horizontal area HA0. "4 bits" is stored as the bit length HBIT1 that indicates the bit length of the correction coefficients stored in the vertical area HA1. "12 bits" is stored as the bit length HBIT2 that indicates the bit length of the correction coefficients stored in the horizontal area HA2.

"100h" is stored as the vertical direction correction coefficient lead address VADR that indicates the lead address of the second storage area 21B. "000h" is stored as the horizontal direction correction coefficient lead address HADR that indicates the lead address of the first storage area 21A.

Turning back to FIG. 1, the components of the shading compensation circuit 10 will be respectively explained.

The horizontal direction counter 23 inputs the horizontal synchronization signal HD and the clock signal PCLK and outputs a horizontal direction counter value HCT indicative of the horizontal position of the pixel data PD. More concretely, the horizontal direction counter 23 is initialized when inputting the horizontal synchronization signal HD and counts the rising edge of the clock signal PCLK. The counted value, i.e., the horizontal direction counter value HCT is output to the first area judgment unit 24.

The vertical direction counter 27 inputs the vertical synchronization signal VD and the horizontal synchronization signal HD and outputs a vertical direction counter value VCT indicative of the vertical position of the pixel data PD. More concretely, the vertical direction counter 27 is initialized when inputting the vertical synchronization signal VD and counts the rising edge of the horizontal synchronization signal HD. The counted value, i.e., the vertical direction counter value VCT is output to the second area judgment unit 28.

The first area judgment unit 24 makes a judgment to determine which of the horizontal areas HA0 to HA2 the horizontal direction counter value HCT from the horizontal direction counter 23 belongs to and outputs a horizontal area value Harea obtained from the judgment. Concretely, this judgment is made by sequentially comparing the horizontal direction counter value HCT to the horizontal direction boundary values HB0 to HB1 stored in the register value 22. More specifically, if it is found from the result of the comparison that 1≦the horizontal direction counter value HCT≦the horizontal direction boundary value HB0, the horizontal direction counter value HCT is determined to belong to the horizontal area HA0 so that 0 is output to the horizontal area value Harea. If the horizontal direction boundary value HB0<the horizontal direction counter value HCT<the horizontal direction boundary value HB1, the horizontal direction counter value HCT is determined to belong to the horizontal area HA1 so that 1 is output to the horizontal area value Harea. If the horizontal direction boundary value HB1<the horizontal direction counter value HCT≦the vertical direction pixel number VW, the horizontal direction counter value HCT is determined to belong to the horizontal area HA2 so that 2 is output to the horizontal area value Harea.

In this way, the shading compensation circuit 10 of this embodiment easily obtains the bit length of the horizontal correction coefficient HHK corresponding to the pixel data PD from the horizontal area value Harea by referring to the bit lengths HBIT0 to HBIT2 stored in the register value 22.

The second area judgment unit 28 makes a judgment to determine which of the vertical areas VA0 to VA2 the vertical direction counter value VCT from the vertical direction counter 27 belongs to and outputs a vertical area value Varea obtained from the judgment. Concretely, this judgment is made by sequentially comparing the vertical direction counter value VCT to the vertical direction boundary values VB0 to VB1 stored in the register value 22. More specifically, if it is found from the result of the comparison that 1≦the vertical direction counter value VCT≦the vertical direction boundary value VB0, the vertical direction counter value VCT is determined to belong to the vertical area VA0 so that 0 is output to the vertical area value Varea. If the vertical direction boundary value VB0<the vertical direction counter value VCT≦the vertical direction boundary value VB1, the vertical direction counter value VCT is determined to belong to the vertical area VA1 so that 1 is output to the vertical area value Varea. If the vertical direction boundary value VB1<the vertical direction counter value VCT≦the horizontal direction pixel number HW, the vertical direction counter value VCT is determined to belong to the vertical area VA2 so that 2 is output to the vertical area value Varea.

In this way, the shading compensation circuit 10 of this embodiment easily obtains the bit length of the vertical correction coefficient VHK corresponding to the pixel data PD from the vertical area value Varea by referring to the bit lengths VBIT0 to VBIT2 stored in the register value 22.

In the first address generation unit 25, the bit lengths (HBIT0 to HBIT2) of the pixels relative to the horizontal direction are cumulatively added based on the results of the judgments made by the first area judgment unit 24, thereby determining a horizontal direction address Haddr to be output to the correction coefficient RAM 21.

FIGS. 4 and 5 are flow charts each showing an operation of the first address generation unit 25. In the control procedure shown in FIG. 4, initialization is executed in step S1 each time the horizontal synchronization signal HD is input. In step S1, the horizontal direction correction coefficient lead address HADR is substituted for a register value ha indicative of the horizontal direction address, whereas 0 is substituted for a register value hbit_cnt indicative of the cumulative sum of the bit lengths.

In the control procedure shown in FIG. 5, a series of processes in Steps S2 to S8 is executed each time the clock signal PCLK is input.

In Step S2, the value of the register value ha is output to the horizontal direction address Haddr. For instance, if the pixel data PD is the lead pixel of the horizontal direction, 000h which is the horizontal direction correction coefficient lead address HADR is output.

In Step S3, branching is executed based on the horizontal area value Harea that is the result of a judgment made by the first area judgment unit 24. Specifically, if the horizontal area value Harea=0 (i.e., the pixel data PD belongs to the horizontal area HA0), the program branches to Step S4. If the horizontal area value Harea=1 (i.e., the pixel data PD belongs to the horizontal area HA1), the program branches to Step S5. If the horizontal area value Harea=2 (i.e., the pixel data PD belongs to the horizontal area HA2), the program branches to Step S6.

In Step S4, since the pixel data PD belongs to the horizontal area HA0, the bit length HBIT0 (12 bits in this embodiment) of the horizontal area HA0 is added to the register value hbit_cnt. Then, the program proceeds to Step S7.

In Step S5, since the pixel data PD belongs to the horizontal area HA1, the bit length HBIT1 (4 bits in this embodiment) of the horizontal area HA1 is added to the register value hbit_cnt. Then, the program proceeds to Step S7.

In Step S6, since the pixel data PD belongs to the horizontal area HA2, the bit length HBIT2 (12 bits in this embodiment) of the horizontal area HA2 is added to the register value hbit_cnt. Then, the program proceeds to Step S7.

In Step S7, a judgment is made to determine whether the register value hbit_cnt is 12 bits. If so, the program branches to Step S8. If not, this control procedure is terminated.

In Step S8, 0 is substituted for the register value hbit_cnt and 1 is added to the register value ha. Thereby, the bit length integrated value is initialized to 0 and the horizontal direction address is incremented by one.

With the control procedure, the first address generation unit 25 is initialized whenever the horizontal synchronization signal HD is input and the horizontal direction address Haddr is generated based on the bit length integrated value whenever the clock signal PCLK is input. This makes it possible to obtain, with a simple arrangement, the horizontal direction address Haddr at which the horizontal correction coefficient HHK corresponding to the pixel data PD is stored, the horizontal correction coefficient HHK being in a condition where the data boundaries of sequential data pieces are linked to one another (this condition is hereinafter referred to as "packed").

In the second address generation unit 29, the bit lengths (VBIT0 to VBIT2) of the pixels relative to the vertical direction are cumulatively added based on the results of the judgments made by the second judgment unit 28, thereby determining a vertical direction address Vaddr to be output to the correction coefficient RAM 21. This procedure will be concretely described with reference to FIGS. 6, 7.

FIGS. 6 and 7 are flow charts each showing an operation of the second address generation unit 29. In the control procedure shown in FIG. 6, initialization is executed in Step S11 each time the vertical synchronization signal VD is input. In Step S11, the vertical direction correction coefficient lead address VADR is substituted for the register value va indicative of the vertical direction address, whereas 0 is substituted for the register value vbit_cnt indicative of the cumulative sum of the bit lengths.

In the control procedure shown in FIG. 7, a series of processes in Step S12 to S18 is executed each time the horizontal synchronization signal HD is input.

In Step S12, the value of the register value va is output to the vertical direction address Vaddr. For instance, if the pixel data PD is the lead pixel of the vertical direction, 100h which is the vertical direction correction coefficient lead address VADR is output.

In Step S13, blanching is executed based on the vertical area value Varea that is the result of a judgment made by the second area judgment unit 28. Specifically, if the vertical area value Varea=0 (i.e., the pixel data PD belongs to the vertical area VA0), the program branches to Step S14. If the vertical area value Varea=1 (i.e., the pixel data PD belongs to the vertical area VA1), the program branches to Step S15. If the vertical area value Varea=2 (i.e., the pixel data PD belongs to the vertical area VA2), the program branches to Step S16.

In Step S14, since the pixel data PD belongs to the vertical area VA0, the bit length VBIT0 (12 bits in this embodiment) of the vertical area VA0 is added to the register value vbit_cnt. Then, the program proceeds to Step S17.

In Step S15, since the pixel data PD belongs to the vertical area VA1, the bit length VBIT1 (6 bits in this embodiment) of the vertical area VA1 is added to the register value vbit_cnt. Then, the program proceeds to Step S17.

In Step S16, since the pixel data PD belongs to the vertical area VA2, the bit length VBIT2 (12 bits in this embodiment) of the vertical area VA2 is added to the register value vbit_cnt. Then, the program proceeds to Step S17.

In Step S17, a judgment is made to determine whether the register value vbit_cnt is 12 bits. If so, the program branches to Step S18. If not, this control procedure is terminated.

In Step S18, 0 is substituted for the register value vbit_cnt and 1 is added to the register value va. Thereby, the bit length integrated value is initialized to 0 and the vertical direction address is incremented by one.

With the control procedure described above, the second address generation unit 29 is initialized whenever the vertical synchronization signal VD is input and the vertical direction address Vaddr is generated based on the bit length integrated value whenever the horizontal synchronization signal HD is input. This makes it possible to obtain, with a simple arrangement, the vertical direction address Vaddr at which the packed, vertical correction coefficient VHK corresponding to the pixel data PD is stored.

In response to an address selection signal SEL, the address selector 30 selects, as an effective address, either of the horizontal direction address Haddr output from the first address generation unit 25 and the vertical direction address Vaddr output from the second address generation unit 29 to output to the correction coefficient RAM 21 as the address addr.

Next, reference is made to FIGS. 8 to 10 to describe the first correction coefficient acquisition unit 26. FIG. 8 is a block diagram showing the configuration of the first correction coefficient acquisition unit 26. The first correction coefficient acquisition unit 26 inputs data Data from the correction coefficient RAM 21 and outputs a horizontal direction correction coefficient value hkeisu according to the bit length of the correction coefficient obtained based on the judgment made by the first area judgment unit 24. The first correction coefficient acquisition unit 26 includes a low-order shift register 26A for storing data Data from the correction coefficient RAM 21 and a high-order shift register 26B coupled to the high-order side of the low-order shift register 26A. In the first correction coefficient acquisition unit 26, the contents of the low-order shift register 26A and the contents of the high-order shift register 26B are linked and shifted to the high-order side according to the bit length HBITn. The high-order shift register 26B inputs a clear signal hsreg2c and the high-order register value hsreg2 which is the contents of the high-order shift register 26B is cleared to 0 according to the clear signal hsreg2c. The high-order register value hsreg2 is output as the horizontal direction correction coefficient value hkeisu.

Reference is made to FIGS. 9, 10 to describe control procedures in the first correction coefficient acquisition unit 26. In the control procedure shown in FIG. 9, initialization is executed in Step S21 each time the horizontal synchronization signal HD is input. In Step S21, 0 is substituted for the register value hbit_cnt indicative of the cumulative sum of the bit lengths of the correction coefficients relative to the horizontal direction.

In the control procedure shown in FIG. 10, a series of processes in Steps S22 to S33 is executed each time the clock signal PCLK is input.

In Step S22, a judgment is made to determine whether the register value hbit_cnt is 12 bits. If it is 12 bits (Yes), the program proceeds to Step S23. If not (No), the program proceeds to Step S25.

In Step S23, 0 is substituted for the register value hbit_cnt. Subsequently, in Step S24, the data Data from the correction coefficient RAM 21 is stored in a low-order register value hsreg1.

In Step S25, the clear signal hsreg2c is input to the high-order shift register 26B and the high-order register value hsreg2 is initialized to 0.

In Step S26, branching is executed based on the result of the judgment made by the first area judgment unit 24. The program branches to Step S27 if the pixel data PD belongs to the horizontal area HA0 and to Step S31 if the pixel data PD belongs to the horizontal area HA2.

In Step S27, the bit length HBIT0 (12 bits in this embodiment) is added to the register value hbit_cnt. In Step S28, the contents of the low-order shift register 26A and the high-order shift register 26B are shifted to the high-order side by the bit length HBIT0. Thereby, the low-order register value hsreg1 is shifted to the high-order register value hsreg2 in this embodiment. Thereafter, the program proceeds to Step S33.

In Step S29, the bit length HBIT1 (4 bits in this embodiment) is added to the register value hbit_cnt. In Step S30, the contents of the low-order shift register 26A and the high-order shift register 26B are shifted to the high-order side by the bit length HBIT1. Thereby, the high-order 4 bits of the low-order register value hsreg1 are shifted to the high-order register value hsreg2 in this embodiment. Thereafter, the program proceeds to Step S33.

In Step S31, the bit length HBIT2 (12 bits in this embodiment) is added to the register value hbit_cnt. In Step S32, the contents of the low-order shift register 26A and the high-order shift register 26B are shifted to the high-order side by the bit length HBIT2. Thereby, the low-order register value hsreg1 is shifted to the high-order register value hsreg2 in this embodiment. Thereafter, the program proceeds to Step S33.

In Step S33, the high-order register value hsreg2 is output as the horizontal direction correction coefficient value hkeisu.

With the control procedure described above, the first correction coefficient acquisition unit 26 is initialized whenever the horizontal synchronization signal HD is input and the horizontal direction correction coefficient value hkeisu is output whenever the clock signal PCLK is input.

Thereby, in the shading compensation circuit 10 of this embodiment, a circuit for taking the horizontal direction correction coefficient value hkeisu one by one from the packed horizontal correction coefficient HHK can be constructed with a simple arrangement in which the low-order shift register 26A and the high-order shift register 26B are used in combination.

Next, the second correction coefficient acquisition unit 31 will be explained with reference to FIGS. 11 to 13. FIG. 11 is a block diagram showing the configuration of the second correction coefficient acquisition unit 31. The second correction coefficient acquisition unit 31 inputs the data Data from the correction coefficient RAM 21 and outputs a vertical direction correction coefficient value vkeisu according to the bit length of the correction coefficient obtained based on the judgment made by the second area judgment unit 28. The second correction coefficient acquisition unit 31 includes a low-order shift register 31A for storing the data Data from the correction coefficient RAM 21 and a high-order shift register 31B coupled to the high-order side of the low-order shift register 31A. In the second correction coefficient acquisition unit 31, the contents of the low-order shift register 31A and the contents of the high-order shift register 31B are linked and shifted to the high-order side according to the bit length VBITn. The high-order shift register 31B inputs a clear signal vsreg2c, and a high-order register value vsreg2 which is the contents of the high-order shift register 31B is cleared to 0 according to the clear signal vsreg2c. The high-order register value vsreg2 is output as the vertical direction correction coefficient value vkeisu.

The control procedures performed by the second correction coefficient acquisition unit 31 will be described with reference to FIGS. 12, 13. In the control procedure shown in FIG. 12, initialization is executed in Step S41 each time the vertical synchronization signal VD is input. In Step S41, 0 is substituted for the register value vbit_cnt indicative of the cumulative sum of the bit lengths of the horizontal direction correction coefficients.

In the control procedure shown in FIG. 13, a series of processes in Steps S42 to S53 is executed each time the horizontal synchronization signal HD is input.

In Step S42, a judgment is made to determine whether the register value vbit_cnt is 12 bits. If it is 12 bits (Yes), the program proceeds to Step S43. If not (No), the program proceeds to Step S45.

In Step S43, 0 is substituted for the register value vbit_cnt. Subsequently, in Step S44, the data Data from the correction coefficient RAM 21 is stored in a low-order register value vsreg1.

In Step S45, the clear signal vsreg2c is input to the high-order shift register 31B and the high-order register value vsreg2 is initialized to 0.

In Step S46, branching is executed based on the result of the judgment made by the second area judgment unit 28. If the pixel data PD belongs to the horizontal area HA0, the program branches to Step S47. If the pixel data PD belongs to the horizontal area HA1, the program branches to Step S49. If the pixel data PD belongs to the horizontal area HA2, the program branches to Step S51.

In Step S47, the bit length VBIT0 (12 bits in this embodiment) is added to the register value vbit_cnt. In Step S48, the contents of the low-order shift register 31A and the high-order shift register 31B are shifted to the high-order side by the bit length VBIT0. Thereby, the low-order register value Vsreg1 is shifted to the high-order register value vsreg2 in this embodiment. Thereafter, the program proceeds to S53.

In Step S49, the bit length VBIT1 (4 bits in this embodiment) is added to the register value vbit_cnt. In Step S50, the contents of the low-order shift register 31A and the high-order shift register 31B are shifted to the high-order side by the bit length VBIT1. Thereby, the high-order 4 bits of the low-order register value Vsreg1 are shifted to the high-order register value vsreg2 in this embodiment. Thereafter, the program proceeds to S53.

In Step S51, the bit length VBIT2 (12 bits in this embodiment) is added to the register value vbit_cnt. In Step S52, the contents of the low-order shift register 31A and the high-order shift register 31B are shifted to the high-order side by the bit length VBIT2. Thereby, the low-order register value Vsreg1 is shifted to the high-order register value vsreg2 in this embodiment. Thereafter, the program proceeds to S53.

In Step S53, the high-order register value vsreg2 is output as the vertical direction correction coefficient value vkeisu.

With the control procedure described above, the second correction coefficient acquisition unit 31 is initialized whenever the vertical synchronization signal VD is input and the vertical direction correction coefficient value vkeisu is output whenever the horizontal synchronization signal HD is input.

Thereby, in the shading compensation circuit 10 of this embodiment, a circuit for taking the vertical direction correction coefficient value vkeisu one by one from the packed horizontal correction coefficient VHK can be constructed with a simple arrangement in which the low-order shift register 31A and high-order shift register 31B are used in combination.

Turning back to FIG. 1, the compensation operation unit 32 will be explained. The compensation operation unit 32 is a section for performing arithmetic compensation operation in which a shading correction value for the pixel data PD is calculated based on the horizontal direction correction coefficient value hkeisu that is the output of the first correction coefficient acquisition unit 26 and the vertical direction correction coefficient value vkeisu that is the output of the second correction coefficient acquisition unit 31. In this embodiment, the pixel data PD, the horizontal direction correction coefficient value hkeisu and the vertical direction correction coefficient value vkeisu are summed to output correction pixel data PO.

Next, reference is made to FIGS. 14, 15 to describe the operation of the shading compensation circuit 10.

In (1), when the vertical synchronization signal VD transitions to a low level, the vertical direction counter 27 is initialized and 0 is output to the vertical direction counter value VCT.

In (3), when the horizontal synchronization signal HD transitions to a low level, the horizontal direction counter 23 is initialized and 0 is output to the horizontal direction counter value HCT.

In (4), the horizontal direction counter 23 counts up upon the rising edge of the clock signal PCLK and 1 is output to the horizontal direction counter value HCT. In addition, the vertical direction counter 27 counts up upon the rising edge of the horizontal synchronization signal HD and 1 is output to the vertical direction counter value VCT. At that time, the vertical area value Varea becomes 0 and 100h is output to the vertical direction address Vaddr. Since the vertical direction address Vaddr is selected according to the address selection signal SEL, 100h is output to the address addr of the correction coefficient RAM 21. Although the bit length VBIT0=12 is substituted for the register value vbit_cnt, the register value va is updated to 101h and the register value vbit_cnt is made to be zero.

In this embodiment, since the vertical correction coefficients VHK and the horizontal correction coefficients HHK are stored in the correction coefficient RAM 21, a weight for reading out of a vertical correction coefficient VHK is inserted when reading out a horizontal correction coefficient HHK. Therefore, in (5), the horizontal area value Harea=0 is recognized and 0h is output to the horizontal direction address Haddr. In addition, since the horizontal direction address Haddr is selected according to the address selection signal SEL, 0h is output to the address addr of the correction coefficient RAM 21. Although the bit length HBIT0=12 is substituted for the register value hbit_cnt, the register value ha is updated to 1h and the register value hbit_cnt is made to be zero.

Additionally, the data Data=400 to be stored in the address addr=100h is read out from the correction coefficient RAM 21 and the vertical direction correction coefficient value vkeisu is set to 400.

In (6), the data Data=40 to be stored in the address addr=0h is read out from the correction coefficient RAM 21 and the horizontal direction correction coefficient value hkeisu is set to 40.

In the compensation operation unit 32, the value (a+400+40) obtained by adding the horizontal direction correction coefficient value hkeisu and the vertical direction correction coefficient value vkeisu to pixel data PD2 is output to the correction pixel data PO. The pixel data PD2, as used herein, refers to a data signal obtained by delaying the pixel data PD by 2 clocks in time with reading out of the vertical correction coefficient VHK and the horizontal correction coefficient HHK from the correction coefficient RAM 21. Thereafter, the same control is performed in (7) and (8).

After the horizontal area value Harea becomes 1 in (8), "10, 1, 0" is read out from the correction coefficient RAM 21 as the horizontal correction coefficient HHK in (9). Since the bit length HBIT1=4, 4 bit high-order shifting takes place in the first correction coefficient acquisition unit 26 and 10 is output to the horizontal direction coefficient value hkeisu. Arithmetic compensation operation is performed in the compensation operation unit 32 and "d+400+10" is output to the correction pixel data PO. Thereafter, the same control is performed in (10) to (14).

After the horizontal area value Harea becomes 2 in (14), 21 is read out from the correction coefficient RAM 21 as the horizontal correction coefficient HHK in (15). Since the bit length HBIT2=12, 12 bit high-order shifting takes place in the first correction coefficient acquisition unit 26 and 21 is output to the horizontal direction coefficient value hkeisu. Arithmetic compensation operation is performed in the compensation operation unit 32 and "j+400+21" is output to the correction pixel data PO. Thereafter, the same control is performed in (16) to (17). In (18) and afterward, the same control as of (5) and later is performed with the vertical direction address Vaddr=101h.

FIG. 16 illustrates the relationship between image data to be subjected to shading compensation by the shading compensation circuit 10 described above and correction coefficients. In the shading compensation circuit 10 of this embodiment, the horizontal correction coefficients HHK are 12 bits in bit length in the peripheral region (i.e., the horizontal area HA0 and the horizontal area HA2) which requires considerable bit length because of a significant gradient in the variation of the shading properties and are 4 bits in bit length in the central region (i.e., the horizontal area HA1) which does not require considerable bit length because of an insignificant gradient in the variation of the shading properties. In contrast with this, the horizontal correction coefficients HHK of the prior art have the same bit length, for instance, 12 bits in all the areas. In this case, the area for storing the horizontal correction coefficients HHK requires 12 words. Compared to the prior art, the shading compensation circuit 10 has a smaller storage area for the horizontal correction coefficients HHK that only requires 8 words (1 word=12 bits). Similarly to this, the storage area for the vertical correction coefficients VHK in the shading compensation circuit 10 require only 6 words, whereas that of the prior art requires 8 words provided that the vertical correction coefficients VHK are 12 bits without variation. Accordingly, the shading compensation circuit 10 requires a smaller storage area for the vertical correction coefficients VHK.

It is apparent that the invention is not necessarily limited to the particular embodiment shown herein and various changes and modifications may be made to the disclosed embodiment without departing from the spirit and scope of the invention.

Although the compensation operation unit 32 of the shading compensation circuit 10 of the present embodiment performs compensation operation by adding the horizontal direction correction coefficient value hkeisu and the vertical direction correction coefficient value vkeisu to the pixel data PD, the invention is also applicable to cases where compensation operation is performed by subtraction, multiplication and division of the horizontal direction correction coefficient value hkeisu and the vertical direction correction coefficient value vkeisu with respect to the pixel data PD.

In addition, although shading compensation is performed on both the horizontal and vertical directions in the shading compensation circuit 10 of the present embodiment, the invention is also applicable to cases where shading compensation is performed on either one of the horizontal and vertical directions.

Although the area for the horizontal correction coefficients HHK and the area for the vertical direction correction coefficients VHK are provided in the correction coefficient RAM 21 in the shading compensation circuit 10 of the present embodiment, the invention is also applicable to cases where these areas are provided in different storage devices. Apparently, there may be used ROM, flash memory and hard disk as the storage device, apart from RAM.

Although the area for the horizontal correction coefficients HHK and the area for the vertical correction coefficients VHK are respectively divided into three parts in the shading compensation circuit 10 of the present embodiment, the invention is also applicable to cases where these areas may be respectively divided into other numbers of parts such as four parts and five parts.

Still further, although the bit lengths (4 bits, 6 bits, 12 bits) of the horizontal correction coefficients HHK and the vertical correction coefficients VHK are the divisor of the bit length (12 bits) of the correction coefficient RAM 21 in the shading compensation circuit 10 of the present embodiment, the invention is not necessarily limited to this but applicable to, for instance, cases where the bit lengths of the horizontal and vertical correction coefficients are 8 bits or 10 bits relative to the bit length (12 bits) of the correction coefficient RAM 21. The invention is also applicable to cases where the bit lengths of the horizontal and vertical correction coefficients are longer than that of the correction coefficient RAM 21.

The horizontal correction coefficients and vertical correction coefficients exemplify the correction coefficients; the first storage area and second storage area exemplify the storage unit; the first address generation unit and second address generation unit exemplify the address generation unit; and the first area judgment unit and second area judgment unit exemplify the area judgment unit.

Use of the invention enables a shading compensation circuit capable of optimizing the bit lengths of correction coefficients for shading compensation and storing these coefficients, so that the amount of correction coefficient data can be reduced.

What is claimed is:

1. A shading compensation circuit for performing shading compensation on image data, the pixels of which are arranged in a horizontal direction and a vertical direction perpendicular to the horizontal direction, such that shading properties with respect to either the horizontal or vertical direction are corrected, the shading compensation circuit comprising:
   a storage unit to store correction coefficients,
   wherein the correction coefficients each have a specified bit length corresponding to pixel position, and
   wherein the correction coefficients for the periphery of the image data are longer in bit length than the correction coefficients for the center of the image data.

2. The shading compensation circuit according to claim 1, wherein the
   storage unit stores the correction coefficients for successive data pieces the boundaries of which are interlinked.

3. The shading compensation circuit according to claim 2, further comprising:
   an address generation unit to generate an address of the storage unit based on the cumulative sum of numbers of bits of the correction coefficients informed by bit-number information.

4. The shading compensation circuit according to claim 2, further comprising:
   a low-order shift register to retain read-out data from the storage unit; and
   a high-order shift register coupled to the high-order side of the low-order shift register,
   wherein after the read-out data from the storage unit is retained by the low-order shift register, the contents of data retained by the low-order shift register and high-order shift register are linked and shifted to the high-order side by the number of bits of the correction coefficients informed by bit-number information and data stored in the high-order shift register is output.

5. The shading compensation circuit according to claim 1, wherein the correction coefficients are allocated for a plurality of areas divided in the horizontal direction or the vertical direction such that the correction coefficients for the areas in the periphery of the image data are longer in bit length than the correction coefficients for the areas at the center of the image data.

6. The shading compensation circuit according to claim 5, further comprising:
   a boundary information storage unit to store area boundary information indicative of the boundaries of the areas;
   a look-up information storage unit to store bit number look-up information indicative of the relationship between the areas and the bit lengths of the correction coefficients;
   an area judgment unit to determine an area to which a specified pixel belongs, referring to the boundary information storage unit; and
   a look-up unit to obtain the bit-number information from the result of the judgment of the area judgment unit and the bit-number look-up information.

7. A method of controlling a shading compensation circuit for performing shading compensation on image data the pixels of which are arranged in a horizontal direction and a vertical direction perpendicular to the horizontal direction, such that shading properties with respect to either the horizontal or vertical direction are corrected,
   the method comprising:
   determining correction coefficients having a specified bit length according to corresponding pixel position; and
   performing shading compensation based on the correction coefficients,
   wherein the correction coefficients for the periphery of the image data are longer than the correction coefficients for the center of the image data.

8. The method of controlling a shading compensation circuit according to claim 7, the shading compensation circuit having a storage unit, the method further comprising:
   storing, in the storage unit, the correction coefficients for successive data pieces the boundaries of which are interlinked.

9. The method of controlling a shading compensation circuit according to claim 8, the method further comprising:
   generating an address of the storage unit based on the cumulative sum of the numbers of bits of the correction coefficients informed by bit-number information.

10. The method of controlling a shading compensation circuit according to claim 8, the shading compensation circuit having a low-order shift register for retaining read-out data from the storage unit and a high-order shift register coupled to the high-order side of the low-order shift register, the method further comprising:
    retaining read-out data from the storage unit by the low-order shift register;
    linking the contents of the low-order shift register and the contents of the high-order shift register and shifting them to the high-order side by the number of bits of the correction coefficients informed by the bit-number information; and
    outputting data stored in the high-order shift register.

11. The method of controlling a shading compensation circuit according to claim 7,
    wherein the correction coefficients are allocated for a plurality of areas divided in the horizontal direction or the vertical direction such that the correction coefficients for the areas in the periphery of the image data are longer in bit length than the correction coefficients for the areas at the center of the image data.

12. The method of controlling a shading compensation circuit according to claim 11, the shading compensation circuit having a boundary information storage unit for storing area boundary information indicative of the boundaries of the areas and a look-up information storage unit for storing bit number look-up information indicative of the relationship between the areas and the bit lengths of the correction coefficients,
    the method further comprising:
    making a judgment to determine an area to which a specified pixel belongs, referring to the boundary information storage unit; and
    obtaining bit-number information from the result of the judgment made in the step of making a judgment and the bit-number look-up information.

* * * * *